US005333510A

United States Patent [19]
Anderson et al.

[11] Patent Number: 5,333,510
[45] Date of Patent: Aug. 2, 1994

[54] ROLLER LOAD MEASURING DEVICE

[75] Inventors: Robert N. Anderson, Galion; Mark R. Bentley, Lexington, both of Ohio

[73] Assignee: Indresco Inc., Dallas, Tex.

[21] Appl. No.: 901,244

[22] Filed: Jun. 19, 1992

[51] Int. Cl.$^5$ .............................................. G01L 5/00
[52] U.S. Cl. .......................... 73/862.581; 73/862.381
[58] Field of Search ............... 73/862.581, 862.541, 73/862.55, 862.642

[56] References Cited

U.S. PATENT DOCUMENTS

| | | | |
|---|---|---|---|
| 3,962,911 | 6/1976 | Grenlund | 73/862.55 |
| 4,175,430 | 0/1979 | Morrison et al. | 73/141 A |
| 4,406,169 | 9/1983 | Ikeuchi et al. | 73/862.541 |
| 5,033,317 | 7/1991 | Van Haag | 73/862.541 |

*Primary Examiner*—Richard E. Chilcot, Jr.
*Assistant Examiner*—R. Biegel
*Attorney, Agent, or Firm*—Jones, Day, Reavis & Pogue

[57] ABSTRACT

A method and apparatus are provided for measuring the load measuring rolling element deformity of rolling element bearings as a result of applied loads by providing a load measuring rolling element in a bore of a rolling element bearing, defining a fluid cavity about a central shaft and first and second end seal means. The fluid cavity is in continuous communication with a fluid conduit, the fluid conduit in communication with an external volumetric liquid measuring means. When the rotating bearing is placed under dynamic loading, the rolling element will distort and the applied load is a function of the amount of distortion of the rolling element, i.e., the fluid cavity thus producing a correlated volumetric change of the amount of fluid contained in the fluid cavity. The load measuring apparatus is calibrated to provide the measurement of three-dimensional loading and averaging of loading along the rotating bearing axis.

20 Claims, 4 Drawing Sheets

ROLLER LOAD MEASURING DEVICE

BACKGROUND OF THE INVENTION

The present invention relates to load compensating bearings and a roller load measuring device. In another aspect the invention relates to an improved method and device for measuring applied load to roller circle construction for a machine having upper and lower frames rotatable with respect to each other in which peak roller loads cause structural and bearing failures. In yet another aspect, the invention is particularly suitable for monitoring bearing loads placed on very large earth moving machinery through in use measurement of rolling element bearing loads.

Heavy earth moving equipment such as draglines, cranes, power shovels and the like generally are supported on a stationary lower portion with the upper portion being rotatable with respect to the lower portion. The upper portion or frame is pivotably supported on a lower portion frame by a live roller circle. In order for the rotatable movement to occur, a vertical center pin is provided with a surrounding circular bearing track or circle having an upper bearing rail attached to the upper frame, a lower bearing rail attached to the lower frame in juxtaposed relationship with the upper bearing rail, and a roller bearing circle having a plurality of conical roller bearings therein for supporting the upper and lower bearing rail. The rollers transmit the weight of the upper frame section and the load handled thereby to the roller bearing circle and, thus, to the lower frame section which is generally stationary. In machines of large size, the load transmitted through the rollers to the lower frame are paramount and can amount to several million pounds. In those machines utilizing a load handling boom which is pivotally connected to the front edge of the rotating frame, the heaviest loads are transmitted to the roller circle bearings in the region of the front edge of the rotating frame or, when the frame is rotated with the load, the heaviest load is transferred to the rolling elements sequentially around the circle.

The application of nonuniform and highly concentrated loads of these magnitudes on small segments of the bearing roller circle create extremely high stresses developed by such loads causing roller bearing deterioration and eventual failure. These highly concentrated loaded conditions create premature wear and failure of the rails and roller bearings which is a costly matter. The large costly machine must be taken out of service with down time sometimes being more costly than the cost of damage to parts and costly materials. The live roller circle consisting of a circular upper rail attached to the underside of the upper frame resting on a complete circle of rollers which, in turn, rests upon a circular lower rail mounted upon the top of the lower frame or base is called "live" in order to distinguish it from slewing rings or other arrangements in common use in which bearing rollers are mounted on shafts affixed to the upper frame. Although live roller circles are generally regarded as the most suitable rotary support for large excavators, they are not without problems.

A frequent problem is the excessive and permanent failure of the rollers due to overloading, uneven surfaces, etc.

Attempts have been made to ascertain the loads which may be transmitted by the live roller circle and rolling elements. However, such attempts have included taking strain readings at selected positions of the structure and from these readings inferring the load transmitted through the bearings. Many factors are assumed in the calculation in the inferred maximum load on any one load bearing element and, thus, the load which is calculated to be transmitted by a particular roller bearing element may be inaccurate. Other methods have included apparatus for measuring roller element bearing loads by the presentation of apparatus for measuring and recording instantaneous bearing loads or the loads on individual components. As it is not possible to build these roller bearing assemblies on raceways which will not distort in hearty loaded use, the roller retaining shafts are loosely fit in the bore of the rollers to enable the rollers to float with respect to the cage to accommodate the distortion of the raceway. In other adaptations the pins are closely fit into the bore of each roller wherein flexible cage distortion is allowed to enable the rollers to conform to the raceway distortion to maximize load sharing.

Methods have been presented wherein the working load of each roller can be monitored by arranging engaging apparatus in the roller element cavity. Measuring apparatus for determining load applied to rolling elements including sensing means have been adapted to be supported in the cavity of the rolling element to monitor a dimension of the cavity which varies with variation as load is applied to said bearing assembly and communication means associated with said sensing means in such a manner as to provide said monitored dimension. Such teachings as found in U.S. Pat. No. 4,175,430 provide a load measuring device inclusive of a measuring device consisting of either a telescope engaging assembly or a transducer assembly mounted inside the roller element bore and within an aperture of a roller retaining shaft configuration. The patent teaches a sensing means for monitoring at least one dimension of the cavity which varies with variations in the load applied.

Need still exists for measurement of applied loads to these roller bearing assemblies which provide the combined effect of three-dimensional change. Significant advantages to measuring volumetric change, as opposed to measuring a single dimension change, are readily understood since the measurement of volume involves almost the entire length of the roller and acts as an averaging device that averages loading effects that are not necessarily evenly distributed along the length of the roller. Volumetric measurements are less likely to be affected by an out-of-round roller bore than, for example, a measuring device which only measures the bore diameter.

Therefore, it is an object of the present invention to provide a three-dimensional method and device for determining rolling element bearing loads. This object is achieved in a rolling element bearing assembly by replacement of the normal roller retaining shaft with a sealing, rotating device allowing the cavity of the rolling element to be filled with fluid. When load is applied to the rolling element, a measurable corresponding volume change occurs which is correlatable to actual load.

SUMMARY OF TEE INVENTION

The present invention relates to a roller load measuring device through measurement of volume change. Measurement of three-dimensional or volume change is achieved by the use of a roller load measuring device which provides a method for measuring rolling element bearing loads during actual use of the rolling element bearings. The device is utilized in cooperation with existing rolling elements and has an internal bore and a roller retaining shaft or pin with a fluid passage conduit therein, an annular sleeve about the shaft including an annular fluid cavity. The shaft and the sleeve are adapted to be mounted in the bore of the rolling element and seal means. For example, O-ring seals and seal retaining rings are provided between the shaft and the inner surface of the rolling element bore at the opposite ends of the rolling element bore to seal the annular cavity between the bore surface and the shaft. The fluid passage conduit and the shaft are in continuous communication with the sealed annular cavity within the rolling element bore and also in continuous communication with an external and remotely disposed liquid level sensing means which can take a number of different forms. The sealed annular cavity, the fluid passage in the shaft, and the connection to the external liquid level sensing means are all fluid filled. When loads are imposed on the rolling element, distortion of the annular cavity occurs forcing fluid in the annular cavity to be displaced and flow from the cavity and through the fluid passage conduit. A measurement of the displaced fluid can provide a measurement of the load applied. The measurement provided in the present invention is of volumetric change which provides the combined effect of three-dimensional change. There are significant advantages in measuring volumetric change, as opposed to measuring a singular dimension. The measurement of volume involves almost the entire length of the roller and acts as an averaging means, i.e., averages loading effects that are not necessarily evenly distributed along the length of the roller. Utilization of the present invention and the volumetric measuring means are less likely to be affected by an out-of-round rolling element than measurement using means that measure only a single dimension. More importantly, the bore of the roller to be measured does not need to be perfectly true. Such an advantage provides for savings in time and effort needed to true the roller bore in preparation of other devices.

Further, it should be recognized that there is still a possibility of some error in a volumetric measurement due to the fact that the roller is usually tapered. A load biased toward the small diameter will likely cause a larger volume change than a load biased towards the large diameter end. However, such a variance would be reduced through the use of a volumetric measurement, i.e., an averaging measurement.

A single dimensional measurement can be in significant error if the roller load is not evenly distributed along the length of the roller. Such conditions can be a problem when the roller is directly over a radial bulkhead since there is no guarantee that the load is centered over the single measurement point.

BRIEF DESCRIPTION OF THE DRAWINGS

Having thus briefly discussed the invention, more detailed discussion and description of the invention follow with reference to the accompanying drawings which illustrate embodiments of the invention and wherein.

DETAILED DESCRIPTION OF THE INVENTION

The present invention is illustrated in an application to monitor the dynamic or static loads imposed on live roller circle assemblies for rotatably supporting an upper frame on a base of excavation machines. Other applications which utilize bearing rollers with replaceable shafts could also provide an environment for the roller measuring device.

Figure 1:
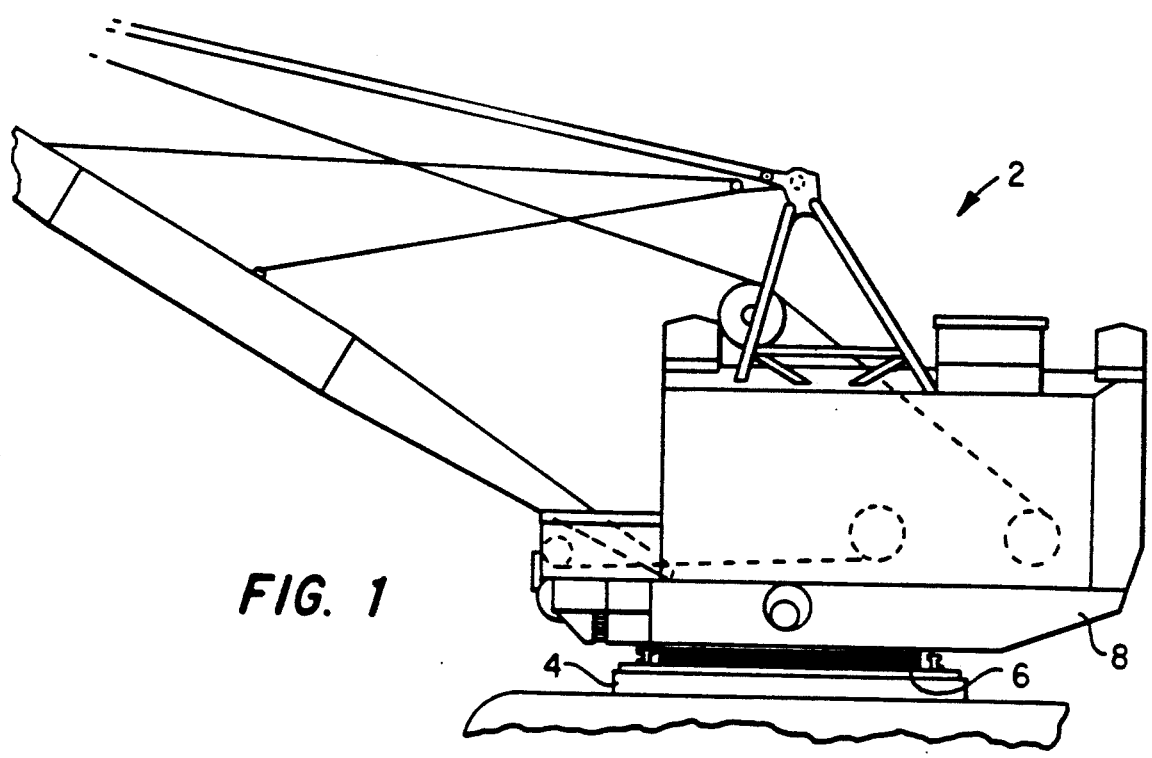
FIG. 1 is a side elevational view of the dragline machine which exemplifies a live roller circle for rotatably supporting the machine upper body, the live roller circle suitable for application of the present invention.

A typical earth moving dragline apparatus 2 is presented in FIG. 1. The dragline apparatus 2 includes a lower base in the form of a tub 4, a live roller circle 6 mounted on the base and an upper frame 8 mounted for rotation relative to the base on the roller circle. Connected to the front end of the upper frame 8 is one end of a boom with the second end of the boom supported by cables secured to the upper end of a gantry which is mounted to the upper frame 8 and enclosed by a typical dragline housing. Also disposed within the housing and supported by the upper frame 8 are various operating machinery inclusive of motor generator set(s), drag and hoist drums, motor drives and the like which are not shown.

The upper frame 8 with all the aforementioned structure and equipment mounted thereon imposes a very large compressive load on the live roller circle 6. In addition, a dragline bucket suspended from a distal end of the boom, because of its weight, capacity and location, imposes a very large eccentric load which shifts about the live roller circle 6 as the upper frame rotates or swings.

Figure 2:
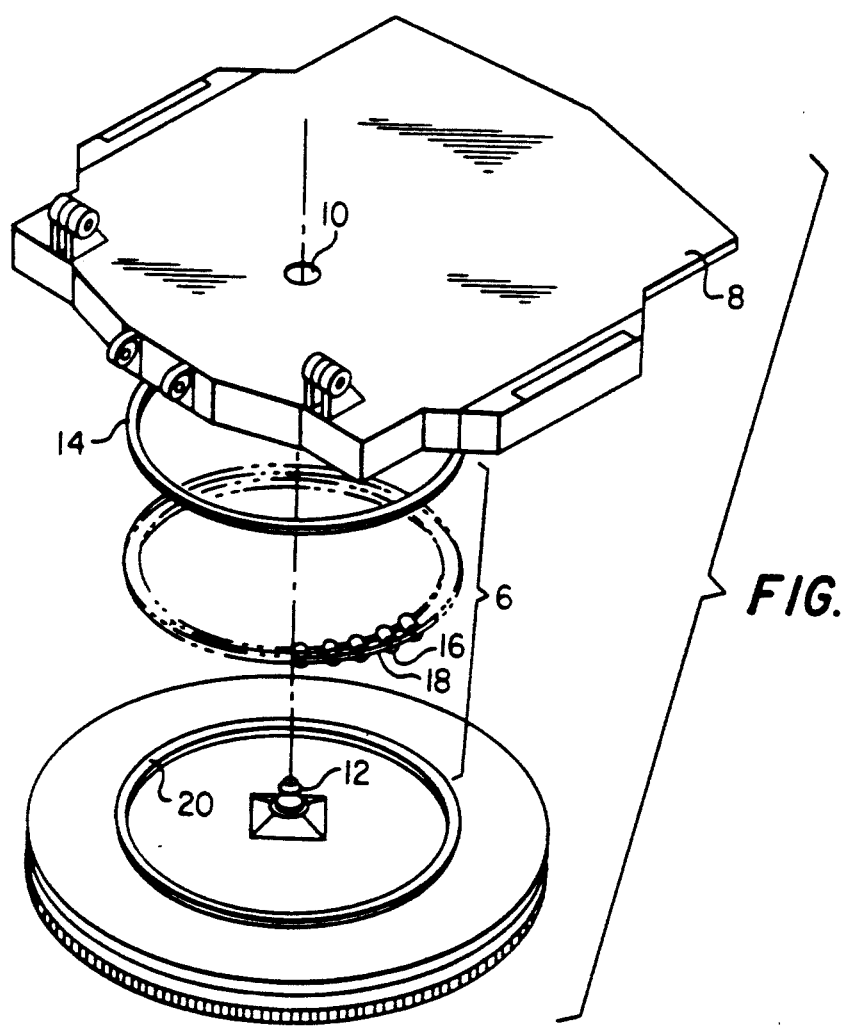
FIG. 2 is an exploded perspective view of a live roller circle supporting the machine upper body of FIG. 1.
Figure 3:
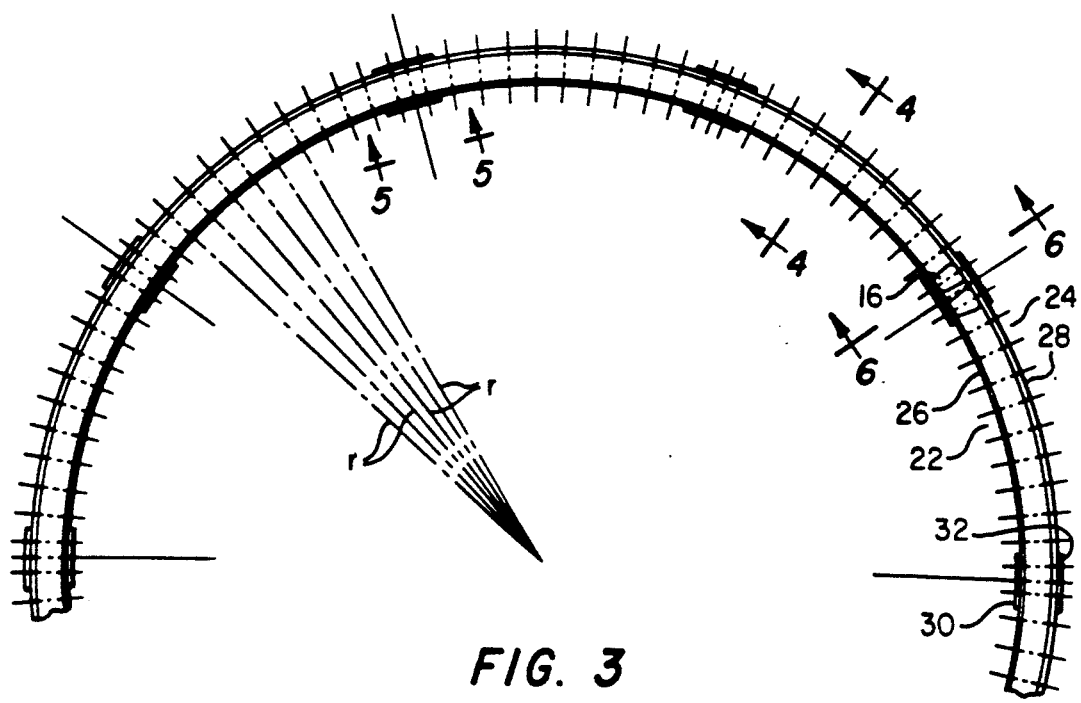
FIG. 3 is a partial plan view of the live roller circle of FIG. 2.

The live roller circle 6 which is a principal subject for the application of the present invention device and methodology is depicted generally in a relationship to the upper and lower frames of the excavator in FIG. 2. The upper frame 8 is apertured at 10 to receive a center journal 12 mounted on the top of the base tub 4. This provides the turning axle for the upper frame and housing. The live roller circle 6 which serves as the antifriction bearing is concentric with the turning axle. The live roller circle 6 generally consists of an upper rail 14, a plurality of rollers 16 arranged and generally held in a circle by a cage 18, and a lower rail 20. The upper rail 14 is mounted to the bottom of the upper frame 8 and the lower rail 20 is secured to the top of the base tub 4. The circle of rollers is disposed between and in rolling contact with the rails 14 and 20. The cage 18 usually comprises inner and outer concentric rings 22 and 24, respectively, as shown in FIG. 3.

The live roller circle 6 is conventional and fully described in U.S. Pat. No. 4,582,436 which is hereby incorporated by reference. Because of the enormous size of these excavation machines, the roller circle may be as much as 60 feet or more in diameter. Due to size, the rails and cage rings are usually made up in segments which are bolted or otherwise connected together in the field. It is usually necessary to machine the rail mounting pads on the upper and lower frames in the field before assembling the roller circle in order to insure that they are flat and concentric. The rollers are supported in spaced circumferential relationship therearound, between inner and outer cage members by means of a shaft or axle for each roller affixed between the inner and outer cage members. As it is not possible to build the support structure sufficiently rigid so that the raceways will not distort in use, the shafts may be a loose fit in the bore of the rollers to enable the rollers to float with respect to the cage. In other applications, each shaft is closely fit in the bore of each roller and supported between a flexible cage structure, whereby the cage will distort to enable the rollers to conform to the distorted raceway to maximize load sharing. In either case, it has been found that a small variation in the diameter of the roller causes greatly increased or decreased loads on the particular roller or the surrounding rollers, thus, it is preferred to utilize an original roller for load gaging operations. By utilizing the present invention, the working load of each roller can be monitored by arranging roller load measuring device insertion into selected rollers and roller stations.

The roller load measuring device and methodology embodying the invention allows for measuring of three-dimensional volumetric change along the entire length or substantially the entire length of the live roller element 16. FIGS. 3 through 6 show in some detail typical live roller circle and rollers, utilized in rotatably mounting excavation equipment on a fixed face. Schematically shown in FIG. 3, a live roller circle 6 is comprised of a plurality of tapered rollers 16 disposed on nominally radial axes in a circular pattern between the inner and outer rings 22 and 24 of a cage 18. The inner cage ring 22 is made of a curved segment 26 of metal plate connected together by the overlapping lengths 30 and the outer cage ring 24 similarly comprises curved segments 28 joined by links 32.

Figure 4:
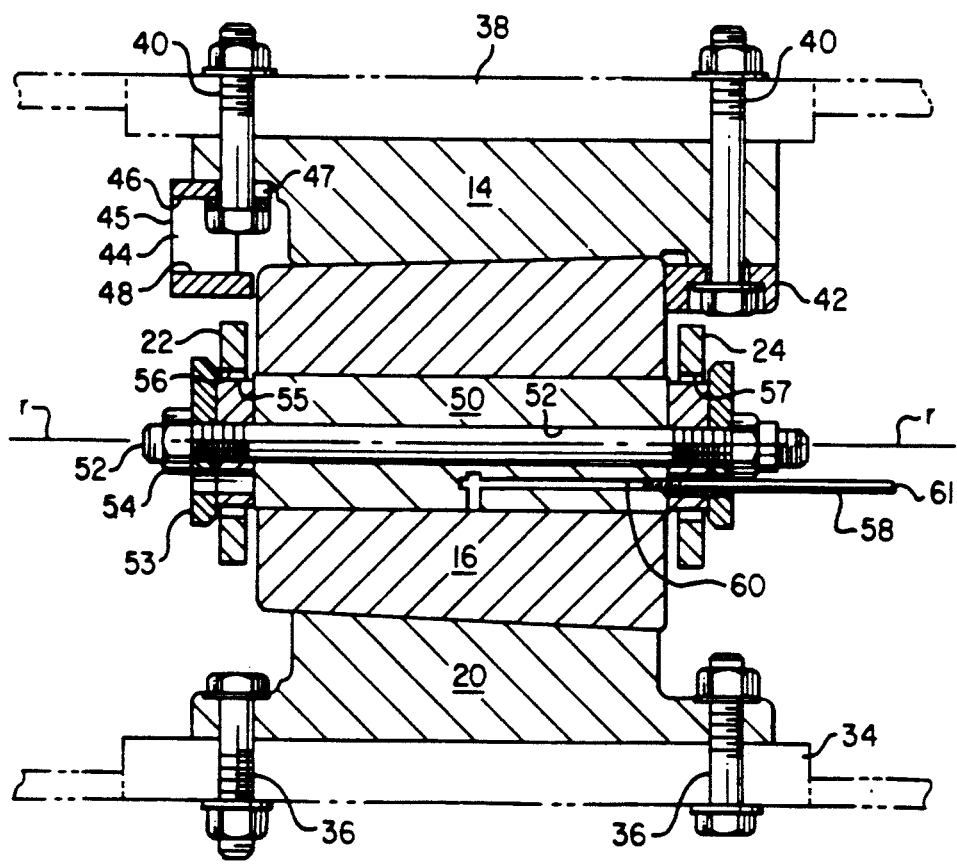
FIG. 4 is a cross section through the live roller circle of FIG. 3 as taken along the line 4—4 showing one use environment for the invention.
Figure 5:
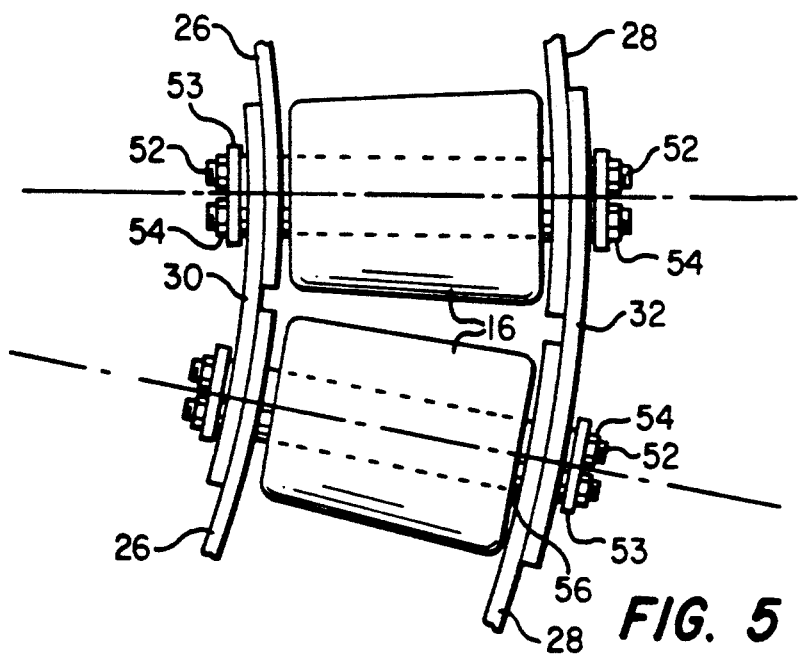
FIG. 5 is an enlarged partial plan view of the roller circle of FIG. 3 illustrating the connection between cage segments and roller pins.
Figure 6:
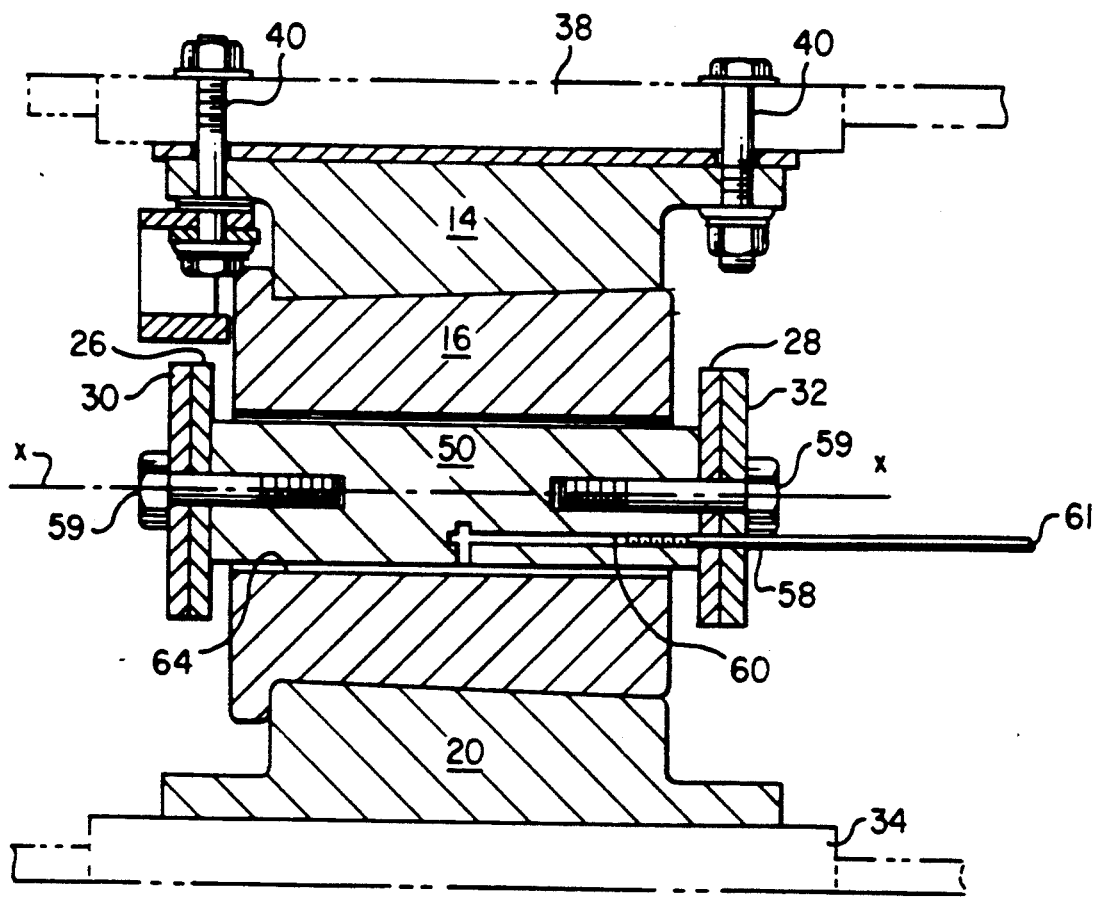
FIG. 6 is a cross-sectional view through the live roller circle of FIG. 3 as taken along line 6—6 showing an alternative use embodiment for the invention.

Referring to FIGS. 4 through 6, the tapered rollers 16 are positioned to roll between upper rail 14 and lower rail 20, both of which are machined at a bevel to match the taper of the roller. The lower rail 20 is connected to an annular pad 34 on the base tub 4 of the dragline by bolts 36. The upper rail 14 is secured to annular pad 38 on the upper frame 8 of the machine by bolts 40.

A third annular rail 42 is provided and extends around the outer circumference of the live roller circle 6, the third annular rail 42 being attached to the upper rail 14 or lower rail 20. In the case of a walking-type dragline, a fourth rail 48 may be provided along a section of the inner perimeter of the live roller circle 6 at the rear of the machine to keep rollers from sliding radially inward from between the rails when the machine is walking. All these fine tunings and adjustments of the live roller circle 6 assemblage are in view of the extreme loads and shifting of loads around the live roller circle 6 which clearly illustrate the continuing need for an improved device and method of measuring load on rollers 16, individually or in combination. The roller 16 is rotatably mounted on shaft 50 in FIG. 4 with normal journal bearing fit. The shaft 50, in turn, is held in place by a pair of pins 52 which extend through the inner and outer cage rings and are secured by thrust washers 53 and nuts 54 at each end. In both FIG. 4 and FIG. 7, fluid or a grease tube 58 extends through outer cage ring 24 and is in communication with an opening 60 in the shaft 50 for providing lubrication or fluid to the space between the roller and axle.

The shaft 50 is provided at each end with a shoulder 55 having a reduced diameter. The shoulders extend through the inner and outer cage rings 22 and 24, however, the fit between the ring and shaft shoulder is deliberately loose. The apertures 56 and 57 and cage rings 22 and 24, respectively, are substantially larger in diameter than the shoulder/collars 55 and the collars are considerably wider than the thickness of the cage rings. Their loose fit allows the shaft 50 freedom to pivot slightly with respect to the aligned cage ring apertures 56 and 57, thus enabling the roller 16 to self-align closer to the normal axis for truer, smoother rolling against the rails 14 and 20, irrespective of the inaccuracies in the alignment of the cage 18.

An additional rolling element embodiment is shown in FIG. 5 wherein the shaft 50 of the roller is connected to the cage ring segments 22 and 24 by a pair of rods secured at each end by nuts 54. Where appropriate, the rods 52 also extend through cage ring connecting links 30 and 32. Unlike FIG. 4, the roller axle 50 is constrained by the alignment apertures and the cage rings. However, the self-aligning capability of the roller 16 is here provided by means of a loose fit between the shaft and the roller. Specifically, the roller is provided with a central bore 64 substantially greater in diameter than the central section of shaft 50. Because of the loose fit of the rollers 16 on their respective shafts, the rollers can seek a roller axis different from the axis of the shaft 50 and closer to the true radial alignment with respect to the live roller circle.

FIG. 6 shows an embodiment where shaft 50 is retained by bolts 59 as opposed to rods 52 and nuts 54 as shown in FIG. 5. Other means are available for maintaining the radial alignment of the rolling element 16. As shown in FIG. 6, rolling element 16 may be manufactured with a flange for this purpose.

Figure 7:
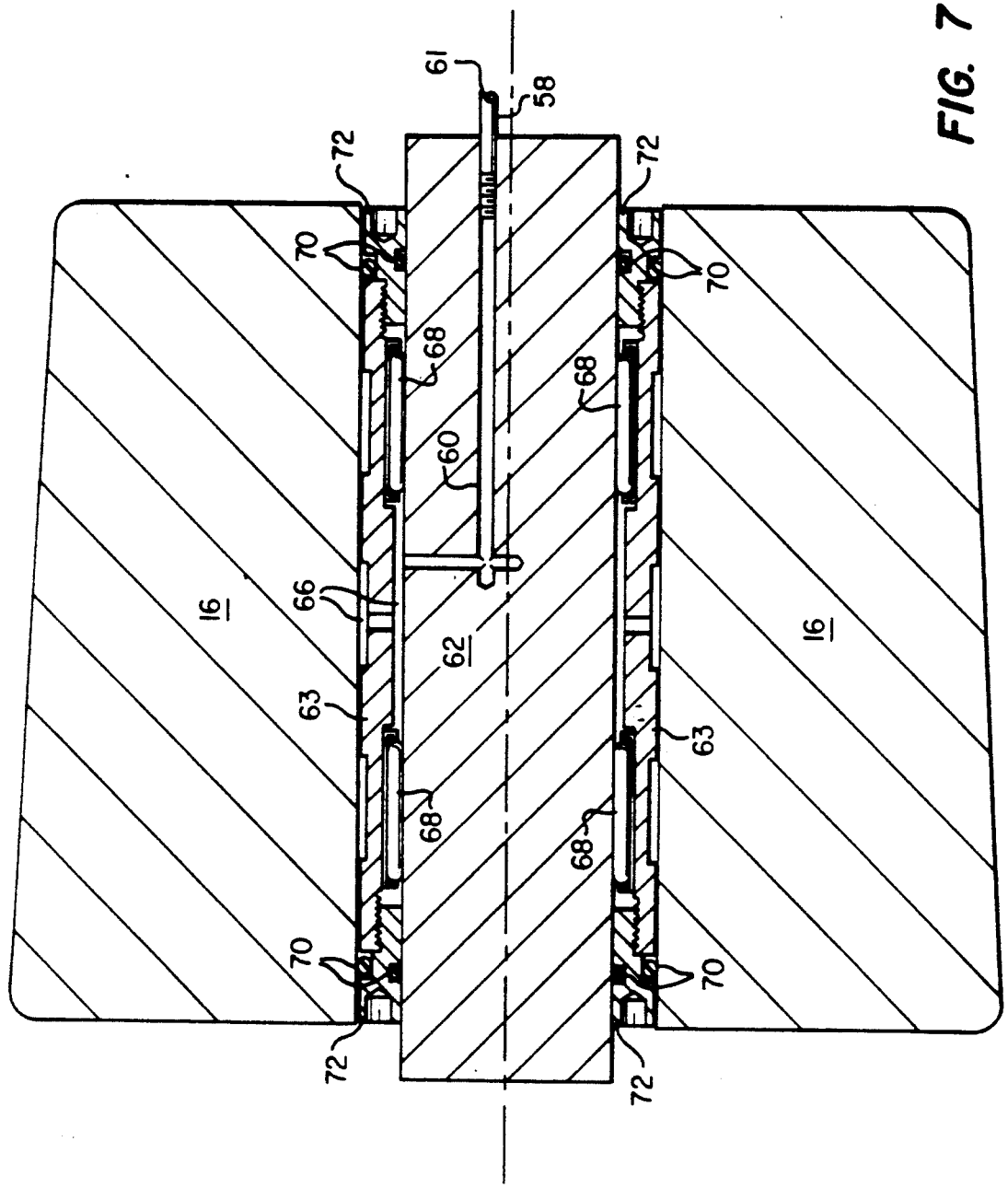
FIG. 7 is an enlarged side view in section of the roller bearing load measurement device of the invention in position for load bearing measurement.

Referring to FIG. 7, an actual rolling element from the bearing under test is removed and the normal roller retaining shaft is replaced with a sealing, rotating roller load measuring device in accordance with the invention which allows the central cavity 66 of the rolling element to be filled with fluid. Conduit means 58, 60 and 61 provide an access for purging air from the cavity and then specifically filling the cavity with a defined volume of fluid before loading. Fluid cavities 66 are in communication with fluid conduits 58, 60 and 61 through shaft 62. Shaft 62 is retained between the inner and outer cages in the same manner as the original shaft. The shaft 62 and sleeve 63 are adapted to be mounted in the bore of roller 16 and O-ring seals 70 and seal retaining rings 72 are provided between the shaft and the inner surface of the rolling element bore at opposite ends of the rolling element bore to seal the annular cavity 66 between the bore surface and the shaft. The seal retaining rings 72 and the sleeve 63 are stationary with respect to roller element 16 and revolve around the shaft 62 via needle bearings 68. The fluid passage conduit in the shaft is in continuous communication with the sealed annular cavity within the rolling element and also in continuous communication with an external chamber (not shown). The external chamber can be remotely disposed with liquid level sensor means which provide for calibrated measurement of the load distortion, i.e., volume change, of the cavity 66. Such an external chamber can be a standpipe of uniform diameter with change in cavity volume presented as a rise and fall in the fluid level in the standpipe. The volumetric change can be electronically monitored.

The sealed annular cavity 66, the fluid passage in shaft 62, and the connection to the external liquid level sensor means are all filled with fluid. When loads are imposed on the rolling element, distortion of the annular cavity 66 occurs forcing fluid in the annular cavity 66 to flow from the cavity 66 into the fluid passage conduit 60, 58 and 61. Measurement of the displaced fluid can be correlated relative to unloaded conditions as a base and the magnitude of the applied load through sensing means.

While the invention has been described in connection with various embodiments, these described embodiments are not intended to limit the scope of the invention to a particular form set forth. The invention as described is intended to cover such alternatives, modifications and equivalents as may be inclusive within the spirit and scope of the merits as defined in the appended claims.

We claim:

1. A method of measuring applied load to a rolling element within a rotating bearing by measuring deformity of the rolling element through measurement of volumetric change of a load measuring rolling element cavity, comprising:

removing the rolling element from an internal bore of the rotating bearing;

replacing the rolling element with a load measuring rolling element, the load measuring rolling element having a central shaft defining with seal means an annular fluid cavity, the load measuring rolling element containing a fluid conduit in communication with the fluid cavity and volumetric measuring means;

filling the fluid cavity and the fluid conduit with liquid;

purging air from the fluid cavity and the fluid conduit;

defining a liquid fill volume of the fluid cavity and fluid conduit without an applied load;

applying load to the rotating bearing containing the load measuring rolling element;

deforming the load measuring rolling element and fluid cavity;

forcing liquid from the fluid cavity and the fluid conduit to the volumetric measuring means;

measuring the fluid cavity volume change by measuring the amount of liquid introduced to the volumetric measuring means; and correlating the volumetric liquid change of the fluid chamber to load application.

2. A method according to claim 1 further including forming the fluid cavity about the axis of rotation of the load measuring rolling element, the fluid cavity extending substantially along the length of the load measuring rolling element, and sealing the fluid cavity at first and second ends by sealing means.

3. A method according to claim 2 wherein measuring volumetric change along substantially the length of the load measuring rolling element provides an averaging of the measured applied load.

4. A method according to claim 3 wherein measuring volumetric change provides an averaging of the measured applied load which is a function of three-dimensional volumetric change.

5. A method according to claim 3 wherein measuring of volumetric change provides an averaging of the measured applied load wherein the fluid cavity is defined by a deformed cylindrical bore and a deformed cylindrical bearing.

6. A method according to claim 1 further including forming the fluid cavity about the axis of rotation of the Load measuring rolling element, the fluid cavity being comprised of one or more fluid cavities along the length of the load measuring roller element, and sealing the fluid cavities at first and second ends of the rolling element with sealing means.

7. A method according to claim 1 further including forming the fluid cavity substantially centrally about the axis of rotation of the load measuring rolling element.

8. A method according to claim 1 wherein deformity occurring as a result of applied load is measured during static or dynamic rotation loading of the rotating bearing and load measuring rolling element.

9. A method according to claim 1 wherein the volumetric measuring means is comprised of an external measuring means capable of measuring volumetric change.

10. A method of determining the load applied to a rolling element of a bearing assembly of the type having a plurality of rolling elements located in operative spaced arrangement between oppositely arranged bearing rails of a cage assembly, the method achieved by measurement of volumetric change of a load measuring rolling element cavity comprising:

removing the rolling element from an internal bore of the rotating bearing;

replacing the rolling element with a load measuring rolling element, the load measuring rolling element having an annular sleeve about a central shaft defining an annual fluid cavity, the shaft containing a fluid conduit in communication with the fluid cavity and external volumetric measuring means;

filling the fluid cavity and the fluid conduit with liquid;

purging air from the fluid cavity and the fluid conduit;

defining a specific liquid fill volume of the fluid cavity and fluid conduit without an applied load;

applying load to the rotating bearing containing the load measuring rolling element and rotating the rotating bearings with the applied load;

defining the load measuring load rolling element and fluid cavity;

forcing liquid from the fluid cavity and the fluid conduit to an external volumetric measuring chamber;

measuring the fluid cavity volume change by measuring the amount of liquid introduced to the volumetric external chamber; and correlating the volumetric liquid change of the fluid chamber to load application.

11. A roller load measuring apparatus for measuring applied load by measurement of volumetric change of a rotating bearing fluid cavity within a roller bearing assembly having a plurality of rolling elements cooperating with oppositely arranged raceways to form a rolling element bearing assembly, comprising:

a rotating bearing having an internal bore, a load measuring rolling element having annular sleeve about a central shaft defining an annular fluid cavity, the shaft containing a fluid conduit in communication with the fluid cavity and an external volumetric measuring means;

the shaft and sleeve singly mounted in the rotating bearing bore;

sealing means between the shaft and an inner surface of the rotating bearing bore, said sealing means provided at first and second ends of the rotating bearing bore and defining first and second ends of the annular fluid cavity between the inner bore surface and shaft; and the fluid conduit in continuous communication with the sealed annular fluid cavity within the rotating bearing bore and with an external volumetric liquid level measuring means.

12. A roller load measuring apparatus according to claim 11 wherein the fluid cavity is formed substantially along the length of the load measuring rolling element.

13. A roller load measuring apparatus according to claim 12 wherein the fluid cavity is comprised of at least one cavity.

14. A roller load measuring apparatus according to claim 11 wherein the fluid cavity is formed substantially along a central portion of the load measuring rolling element.

15. A roller load measuring apparatus according to claim 11 wherein the internal bore is cylindrical.

16. A device for measuring applied load to a roller bearing assembly comprised of a plurality of rolling elements supported between oppositely arranged raceways, at least one of the rolling elements having a bore, the device comprising:

a load measuring rolling element having an annular sleeve about a central shaft thereby defining an annular fluid cavity between the annular sleeve and central shaft, the shaft containing fluid conduit in communication with the fluid cavity and an external volumetric measuring means;

the shaft and sleeve singly mounted in a rotating bearing bore;

sealing means between the shaft and an inner surface of the rotating bearing bore, said sealing means provided at first and second ends of the rotating bearing bore to seal the annular fluid cavity between the inner bore surface and shaft; and the fluid conduit in continuous communication with the sealed annular fluid cavity within the rotating bearing bore and with an external liquid volumetric level measuring means.

17. A device for measuring applied load and a roller bearing assembly according to claim 16 wherein at least one fluid cavity is in communication with at least one fluid conduit.

18. A device for measuring applied load to a roller bearing assembly according to claim 16 wherein the fluid cavity extends substantially along the length of the load measuring rolling element.

19. A device for measuring applied load to a roller bearing assembly according to claim 16 wherein the device measures volumetric change of the fluid cavity and provides an averaging of the measured applied load.

20. A machine having an upper body and a lower body supported for relative rotation about a substantially vertical axis, the machine having upper and lower frames rotatable with respect to each other, the upper and lower frames rotatable by means of a bearing assembly, the bearing assembly comprising a plurality of rolling elements supported between oppositely arranged raceways and including at least one rotating bearing having an annular sleeve about a central shaft thereby defining an annular fluid cavity between the annular sleeve and central shaft, the shaft containing fluid conduit in communication with the fluid cavity and an external volumetric measuring means;

a shaft and sleeve singly mounted in a rotating bearing bore;

sealing means between the shaft and an inner surface of the rotating bearing bore, said sealing means provided at first and seconds ends of the rotating bearing bore to seal the annular fluid cavity between the inner bore surface and shaft; and the fluid conduit in continuous communication with the sealed annular fluid cavity within the rotating bearing bore and with an external volumetric liquid level measuring means.

* * * * *